(12) United States Patent
Shinmura et al.

(10) Patent No.: US 7,235,908 B2
(45) Date of Patent: Jun. 26, 2007

(54) MOTOR ACTUATOR HAVING MOTOR HOLDING ARRANGEMENT

(75) Inventors: Naohisa Shinmura, Iwata (JP); Yukinobu Kujira, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 328 days.

(21) Appl. No.: 10/932,023

(22) Filed: Sep. 2, 2004

(65) Prior Publication Data
US 2005/0052087 A1    Mar. 10, 2005

(30) Foreign Application Priority Data
Sep. 8, 2003    (JP)    .............................. 2003-315919

(51) Int. Cl.
*H02K 5/00* (2006.01)
(52) U.S. Cl. ........................... 310/91; 310/89; 248/669
(58) Field of Classification Search ................ 310/89, 310/51, 91; 248/658, 667, 669
See application file for complete search history.

(56) References Cited

U.S. PATENT DOCUMENTS

| | | | | |
|---|---|---|---|---|
| 2,035,733 A | * | 3/1936 | Wall | .......................... 248/667 |
| 3,553,506 A | * | 1/1971 | Fresard | .......................... 310/91 |
| 4,094,207 A | * | 6/1978 | Fischer | .......................... 74/425 |
| 4,630,145 A | * | 12/1986 | Thompson et al. | ...... 360/77.08 |
| 4,700,095 A | * | 10/1987 | Kawakami | ..................... 310/91 |
| 5,307,703 A | * | 5/1994 | Kurosawa | ....................... 74/89 |
| 5,619,084 A | * | 4/1997 | Lau | ......................... 310/154.14 |
| 6,107,707 A | * | 8/2000 | Dwyer | .......................... 310/51 |
| 6,465,915 B1 | * | 10/2002 | Kerdjoudj et al. | .... 310/40 MM |
| 2002/0047380 A1 | * | 4/2002 | Ibata | ............................ 310/89 |

FOREIGN PATENT DOCUMENTS

| EP | 1 168 579 A1 | 1/2002 |
|---|---|---|
| JP | A-8-70553 | 3/1996 |
| JP | A-9-163670 | 6/1997 |

* cited by examiner

*Primary Examiner*—Burton S. Mullins
*Assistant Examiner*—Erik Preston
(74) *Attorney, Agent, or Firm*—Posz Law Group, PLC

(57) ABSTRACT

A motor includes a motor housing and a rotor that is rotatably received in the motor housing. Holding portions hold the motor in a manner that limits turning of the motor housing around a rotational axis of the motor while permitting movement of the motor housing in a predetermined direction, which is perpendicular to the rotational axis of the motor.

14 Claims, 4 Drawing Sheets

MOTOR ACTUATOR HAVING MOTOR HOLDING ARRANGEMENT

CROSS REFERENCE TO RELATED APPLICATION

This application is based on and incorporates herein by reference Japanese Patent Application No. 2003-315919 filed on Sep. 8, 2003 and Japanese Patent Application No. 2004-222434 filed on Jul. 29, 2004.

BACKGROUND OF THE INVENTION

1. Field of the Invention

The present invention relates to a motor holding arrangement and a motor actuator having the same.

2. Description of Related Art

When a motor is actuated or stopped, a torque is applied to a rotor. Upon application of the torque to the rotor, a reaction force is generated. This reaction force causes application of a torque to a stator and to a motor housing in an opposite direction. Thus, the motor housing receives the torque generated by the reaction force and tries to turn around a rotational axis of the motor. Thus, the motor housing needs to have a motor holding arrangement, which limits the turning of the motor housing around the rotational axis caused by the reaction force.

In general, the motor holding arrangement used in a motor actuator has power supply parts, each of which is made of a metal plate piece. The power supply parts hold the motor housing in such a manner that terminals of the motor provided in the motor housing are clamped by the power supply parts to limit the turning of the motor housing. Such a motor holding arrangement is disclosed in, for example, Japanese Unexamined Patent Publication No. H08-70553.

Since each power supply part is made of the metal plate piece, the power supply part does not have sufficient strength for limiting the turning of the motor housing caused by the reaction force. Therefore, the turning of the motor housing caused by the reaction force cannot be sufficiently limited. Furthermore, when the terminals of the motor are bent to have a planar shape, it is difficult to use the terminals to hold the motor housing. In such a case, a separate motor holding arrangement needs to be provided.

SUMMARY OF THE INVENTION

The present invention addresses the above disadvantages. Thus, it is an objective of the present invention to provide a motor holding arrangement, which is capable of effectively limiting turning of a motor housing of a motor caused by a reaction force exerted in a rotor at the time of actuating the motor or at the time of stopping the motor. It is another objective of the present invention to provide a motor actuator, which has such a motor holding arrangement.

To achieve the objectives of the present invention, there is provided a motor holding arrangement, which includes a motor and at least one holding portion. The motor includes a motor housing and a rotor. The rotor is rotatably received in the motor housing. The at least one holding portion holds the motor in a manner that limits turning of the motor housing around a rotational axis of the motor while permitting movement of the motor housing in a predetermined direction, which is perpendicular to the rotational axis of the motor.

To achieve the objectives of the present invention, there is also provided a motor actuator, which includes a motor and a casing. The motor includes a motor housing and a rotor. The rotor is rotatably received in the motor housing. The casing receives the motor and has at least one holding portion. The at least one holding portion holds the motor in a manner that limits turning of the motor housing around a rotational axis of the motor while permitting movement of the motor housing in a predetermined direction, which is perpendicular to the rotational axis of the motor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention, which is embodied in a vehicle air conditioning system, will be described with reference to the accompanying drawings.

Figure 1:
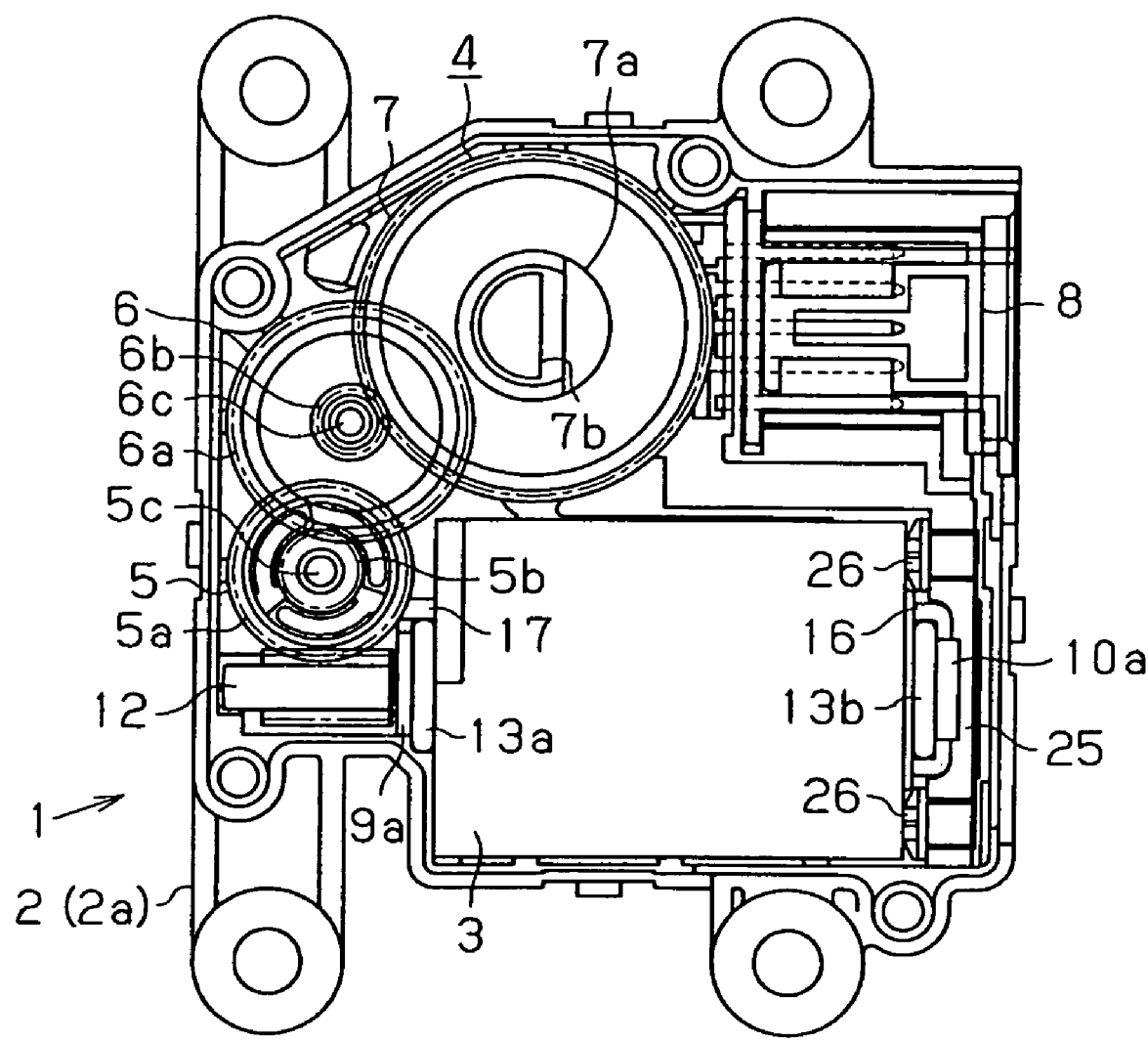
FIG. 1 is a schematic front view of a motor actuator according to an embodiment of the present invention.

A motor actuator 1 of the embodiment shown in FIG. 1 is provided in each of various doors of the vehicle air conditioning system, such as an air intake opening switching door, a temperature adjusting door and an air outlet switching door, to open or close it.

As shown in FIG. 1, the motor actuator 1 includes a casing 2, a motor 3, a first speed reducing gear 5, a second speed reducing gear 6, a third speed reducing gear 7 and an electricity conducting unit 8. The first speed reducing gear 5, the second speed reducing gear 6 and the third speed reducing gear 7 constitute a speed reducing mechanism 4.

Figure 2A:
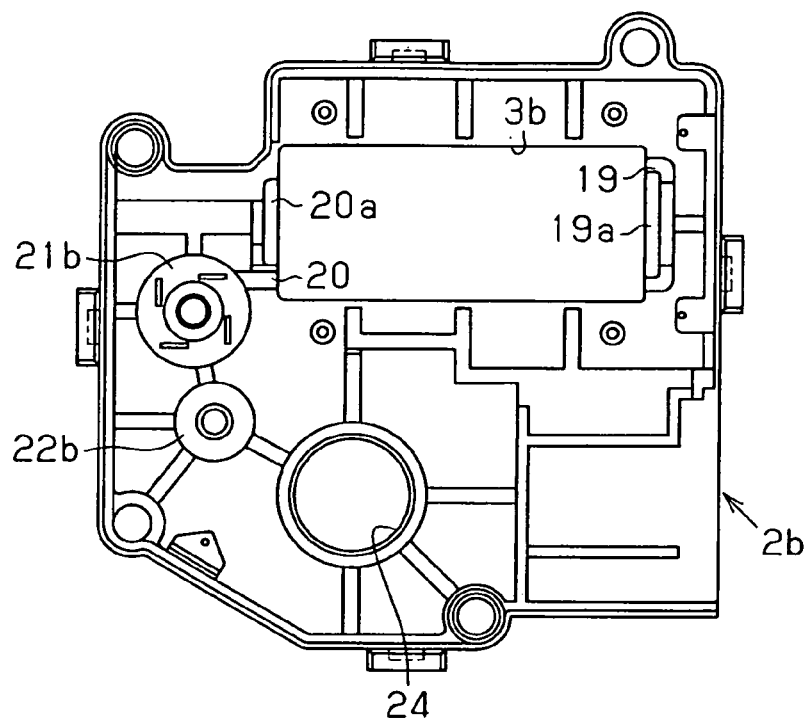
FIG. 2A is a front view of a cover part of a casing of the motor actuator.
Figure 2B:
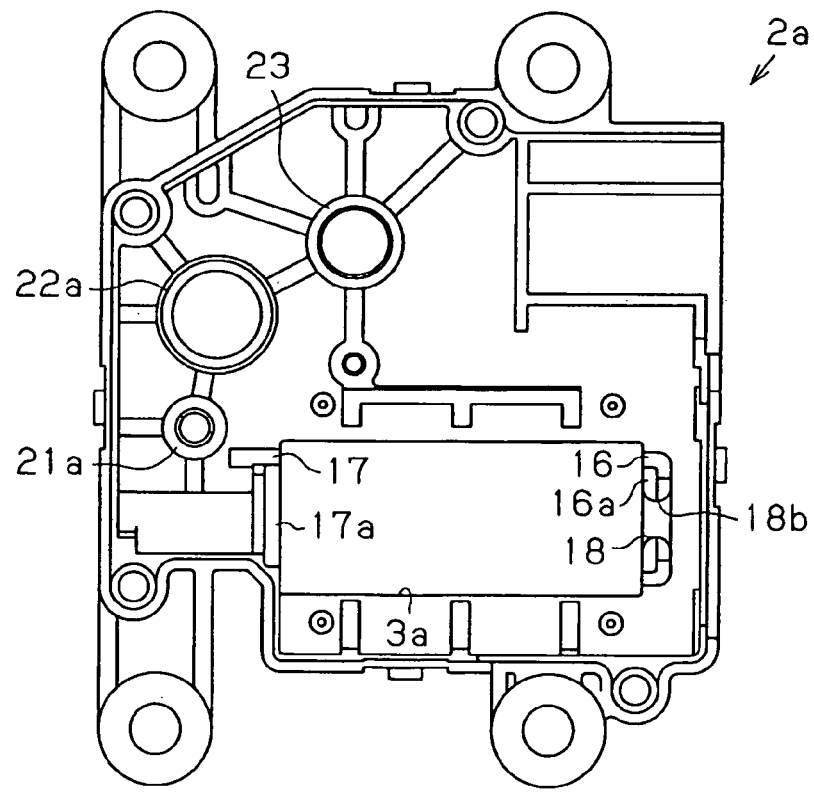
FIG. 2B is a front view of a case part of the casing.

As shown in FIGS. 2A and 2B, the casing 2 is made of resin and includes a case part (first casing part) 2a and a cover part (second casing part) 2b. The case part 2a is constructed to receive the above respective components, and the cover part 2b is fitted to an opening of the case part 2a to cover the opening of the case part 2a. A receiving recess 3a is provided in a base of the case part 2a to receive the motor 3.

Figure 3A:
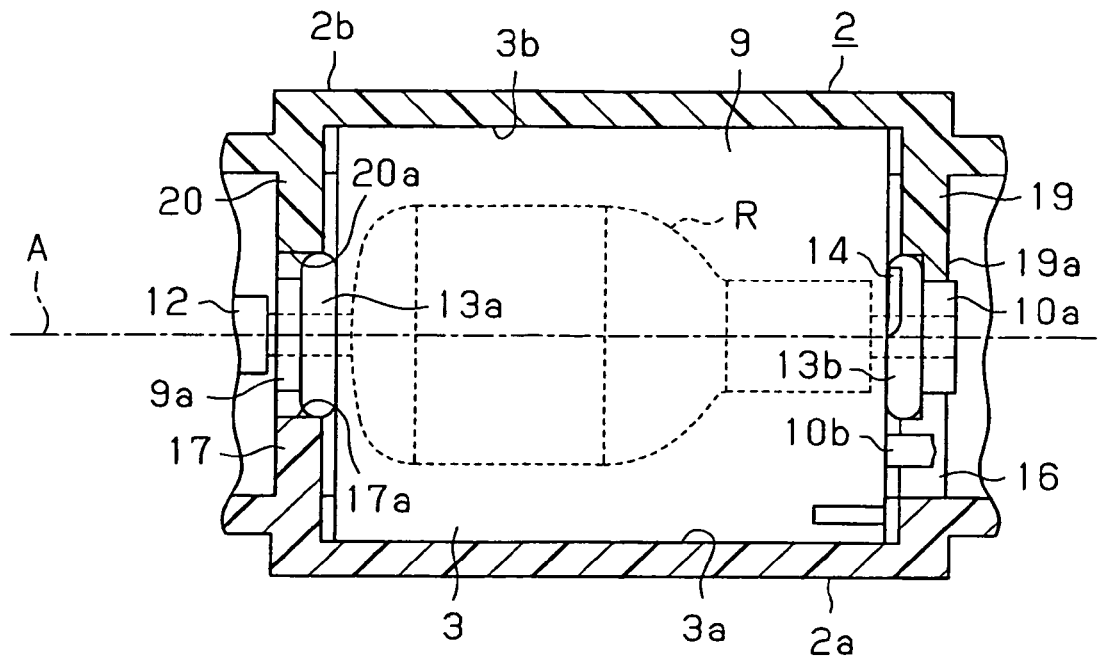
FIG. 3A is a schematic cross sectional view showing a motor holding arrangement of the motor actuator.
Figure 3B:
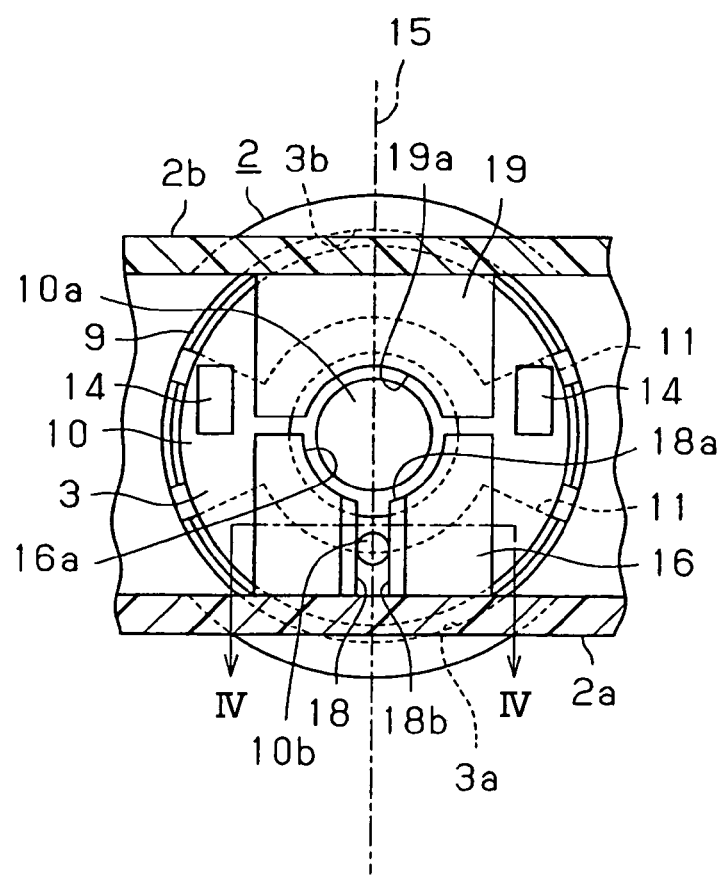
FIG. 3B is a partial front view of the motor holding arrangement.

As shown in FIGS. 3A and 3B, the motor 3 has a motor housing, which includes a cup-shaped yoke housing 9 and an end frame 10. The end frame 10 is made of resin and covers an opening of the yoke housing 9. Two arcuate permanent magnets (two magnetic poles) 11 are secured to an inner peripheral surface of the yoke housing 9 in a diametrically opposed relationship. A rotor R is rotatably received at radially inward of the permanent magnets 11. A bearing part 9a is formed integrally in a base of the yoke housing 9 and projects axially outwardly. A bearing (not shown) is received in the bearing part 9a to rotatably support a rotatable shaft of the rotor R. A receiving through hole (not shown) penetrates through the center of the bearing part 9a. The rotatable shaft of the rotor R protrudes outside of the yoke housing 9 through the receiving through hole of the bearing part 9a. A worm 12 is connected to a protruding portion of the rotatable shaft of the rotor R to rotate integrally with the rotatable shaft. In the present embodiment, a rubber ring (elastic member) 13a is fitted to an outer peripheral surface of the bearing part 9a.

A bearing part 10a is formed integrally in the center of the end frame 10 in such a manner that the bearing part 10 projects axially outwardly. A bearing (not shown), which supports the rotatable shaft of the rotor R is received in the bearing part 10a. In the present embodiment, a rubber ring (elastic member) 13b is fitted to an outer peripheral surface of the bearing part 10a. The end frame 10 includes two motor terminals 14, which project axially outwardly. The motor terminals 14 are bent in a direction away from the base of the case part 2a.

Furthermore, as shown in FIG. 3A, a cylindrical holding projection (first engaging portion) 10b is formed integrally in an outer end surface of the end frame 10 at a location, which is spaced away from the center of the end frame 10. The holding projection 10b projects in a direction parallel to the rotational axis A of the motor 3. Furthermore, as shown in FIG. 3B, the holding projection 10b is located on an imaginary line, which is perpendicular to the rotational axis A of the motor 3 and is parallel to a magnetic pole center line 15 of the permanent magnets (magnetic poles) 11. The magnetic pole center line 15 extends through a center of each of the two magnetic poles. In FIG. 3B, this imaginary line coincides with the magnetic pole center line 15 since they overlap with one another in the axial direction of the motor 3.

Two motor holding portions 16, 17 are formed at longitudinal ends, respectively, of the receiving recess 3a in an inner surface of the case part 2a to hold the motor 3. The motor holding portions 16, 17 project toward the interior of the case part 2a.

A holding groove (second engaging portion) 18, to which the holding projection 10 is engaged, is formed in the motor holding portion 16, which holds the motor 3 on an end frame 10 side of the motor 3. The holding groove 18 is notched or recessed at a position that is located on the imaginary line, which is perpendicular to the rotational axis A of the motor 3 and is parallel to the magnetic pole center line 15 of the permanent magnets 11. The holding groove 18 is recessed in a direction perpendicular to a plane, which includes the rotational axis A of the motor 3. In the present embodiment, the plane, which includes the rotational axis A of the motor 3, extends along the rotational axis A and is perpendicular to a plane of FIG. 3A. The holding groove 18, which is formed in the above-described manner, limits turning of the holding projection 10b about the rotational axis A and allows movement of the holding projection 10b in a predetermined direction, which is perpendicular to the rotational axis A. That is, the holding groove 18 is engaged with the holding projection 10b, so that the holding groove 18 limits the turning of the holding projection 10b around the rotational axis A of the motor 3 and allows the movement of the holding projection 10b in the predetermined direction perpendicular to the rotational axis A of the motor 3. In the present embodiment, the predetermined direction, which is perpendicular to the rotational axis A, coincides with an installation direction, in which the cover part 2b is installed to the case part 2a.

A width of the holding groove 18, which is measured in a left-right direction in FIG. 3B is generally the same as an outer diameter of the holding projection 10b. A longitudinal length of the holding groove 18, which is measured in the vertical direction in FIG. 3B, is longer than the outer diameter of the holding projection 10b. The holding projection 10b, which is engaged with the holding groove 18, is arranged at or around the longitudinal center (the vertical center in FIG. 3B) of the holding groove 18. An arcuate holding recess 16a is formed in the holding portion 16 along the ring 13b at an opening 18a of the holding groove 18.

Figure 4:
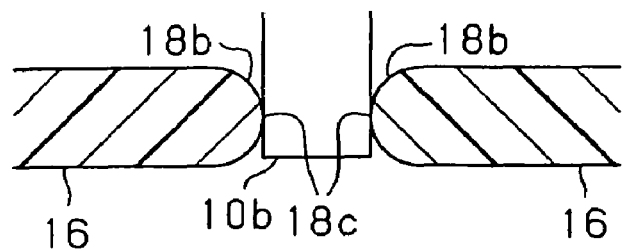
FIG. 4 is a cross sectional view along line IV—IV in FIG. 3B.

As shown in FIG. 4, each of inner edges (or inner surfaces) 18b, which extend in the longitudinal direction of the holding groove 18, has an arcuate shape, which is bulged toward the other one of the inner edges 18b, when the inner edges 18b are seen in a direction parallel to the magnetic pole center line 15. Thus, a connection 18c between each inner edge 18b and the holding projection 10b is a point-like connection (point contact).

As shown in FIG. 3A, a holding recess 17a is formed in the motor holding portion 17, which holds the motor 3 at the base side of the yoke housing 9. The holding recess 17a is similar to the holding recess 16a and has an arcuate shape, which is curved along the ring 13a.

A receiving recess 3b is formed in the cover part 2b. The receiving recess 3b cooperates with the receiving recess 3a to receive the motor 3. Two motor holding portions 19, 20 are formed at longitudinal ends, respectively, of the receiving recess 3b to projects toward the interior of the cover part 2b. The motor holding portions 19, 20 cooperate with the motor holding portions 16, 17 to hold the motor 3.

Holding recesses 19a, 20a are formed in the motor holding portions 19, 20, respectively. Each holding recess 19a, 20a is similar to the holding recess 16a and has an arcuate shape, which is curved along the corresponding ring 13a, 13b.

Thus, the motor 3 is supported by the motor holding portions 16, 17, 19, 20 through the rings 13a, 13b. In this way, the motor 3 (the motor housing) does not directly contact the motor holding portions 16, 17, 19, 20, and the rings 13a, 13b absorb or damp vibration. Therefore, conduction of vibration from the motor 3 to the casing 2 is reduced. Furthermore, in the motor 3, the holding projection 10b, which is provided in the motor housing, is received in the holding groove 18, which is formed in the motor holding portion 16. The holding projection 10b engages the holding groove 18 in the rotational direction of the motor 3.

As shown in FIGS. 1, 2A and 2B, bearings 21a, 22a, 23 are formed in the case part 2a to support the first speed reducing gear 5, the second speed reducing gear 6 and the third speed reducing gear 7, respectively.

Also, bearings 21b, 22b are formed in the cover part 2b to support the first speed reducing gear 5 and the second speed reducing gear 6, respectively, in corporation with the bearings 21a, 22a, respectively. Furthermore, a bearing hole 24 is also formed in the cover part 2b to support the third speed reducing gear 7 in corporation with the bearing 23.

The first speed reducing gear 5 is meshed with the worm 12, which is connected to the rotatable shaft of the motor 3 to rotate integrally therewith. The second speed reducing gear 6 is meshed with the first speed reducing gear 5, and the third speed reducing gear 7 is meshed with the second speed reducing gear 6. More specifically, the first speed reducing gear 5 includes a large diameter gear 5a, a small diameter gear 5b and a support shaft 5c, which are formed integrally. The first speed reducing gear 5 is rotatably supported by the bearings 21a, 21b. Similarly, the second speed reducing gear 6 includes a large diameter gear 6a, a small diameter gear 6b and a support shaft 6c, which are formed integrally. The second speed reducing gear 6 is rotatably supported by the bearings 22a, 22b. An output shaft 7a is formed integrally in the third speed reducing gear 7. One end of the output shaft 7a of the third speed reducing gear 7 is supported by the bearing 23, and the other end of the output shaft 7a is received through the bearing hole 24. In this way, the third speed reducing gear 7 is rotatably supported. An output portion 7b is formed in a distal end of the output shaft 7a, which protrudes from the bearing hole 24, to limit free rotation of the output shaft 7a. The output portion 7b has a D-shaped cross section, and a flat surface of the output portion 7b extends in the axial direction.

Thus, rotation of the worm 12, which is driven by the motor 3, is conducted to the large diameter gear 5a of the first speed reducing gear 5 and is then conducted to the large diameter gear 6a of the second speed reducing gear 6 through the small diameter gear 5b of the first speed reducing gear 5. Thereafter, the rotation is conducted from the small diameter gear 6b of the second speed reducing gear 6 to the third speed reducing gear 7 and is outputted from the output portion 7b of the output shaft 7a.

The electricity conducting unit 8, which is received in the case part 2a, controls operation of the motor actuator 1. The electricity conducting unit 8 includes a power supply part 25. Two power supply terminals 26 of the power supply part 25 engage the motor terminals 14, respectively, to supply electricity to the motor 3.

Next, operation of the motor actuator 1 of the present embodiment will be described.

When the motor 3 is actuated, a torque is applied in a direction for rotating the rotor R. Then, a torque, which is applied in a direction opposite from the rotational direction of the rotor R, is generates as a reaction force in the stator (in the yoke housing 9 and the permanent magnets 11) to turn the motor housing (i.e., the yoke housing 9 and the end frame 10) of the motor 3 around the rotational axis A. However, the holding projection 10b is engaged with the holding groove 18, which limits rotation of the holding projection 10b, so that the turning of the motor housing (i.e., the yoke housing 9 and the end frame 10) of the motor 3 is advantageously limited.

The same thing happens at the time of stopping the motor 3.

Next, advantages of the present embodiment will be described.

(1) The holding projection 10b is engaged with the holding groove 18. Thus, it is possible to limit the turning of the motor housing (i.e., the yoke housing 9 and the end frame 10) of the motor 3 caused by the reaction force generated in response to the torque applied to the rotor R at the time of actuating the motor 3 or at the time of stopping the motor 3.

(2) The holding groove 18 extends in the direction perpendicular to the plane, which includes the rotational axis A of the motor 3. Thus, movement of the motor 1 in the predetermined direction that is perpendicular to the plane, which includes the motor 3, is permitted. This predetermined direction coincides with the installation direction of the motor 3 at the time of installing the motor 3 to the case part 2a and also coincides with the installation direction of the cover part 2b to the case part 2a. Therefore, the motor 3 can be easily assembled to the case part 2a. Furthermore, at the time of assembly, the motor 3 can be received in the case part 2a by inserting the holding projection 10b in the holding groove 18, allowing easy motor assembly work.

(3) The holding groove 18 is formed in the motor holding portion 16 along the imaginary line, which is perpendicular to the rotational axis A of the motor 3 and is parallel to the magnetic pole center line 15. In general, magnetic vibration of the motor 3 tends to occur in the direction of the magnetic pole center line 15. When the holding groove 18 is formed along the imaginary line, which is perpendicular to the rotational axis A of the motor 3 and is parallel to the magnetic pole center line 15, the direction of vibrational of the holding projection 10b caused by the magnetic vibration coincides with the extending direction of the holding groove 18. Thus, the holding projection 10b can be vibrated in the holding groove 18. Therefore, vibration of the motor holding portion 16, which includes the holding groove 18, is limited even when the holding projection 10b is vibrated. Therefore, conduction of the magnetic vibration from the holding projection 10b to the casing 2 through the holding groove 18 is limited, and generation of noise caused by the vibration of the casing 2 can be advantageously limited.

(4) The holding projection 10b is provided near the respective connections between the motor terminals 14 and the corresponding power supply terminals 26 and is engaged with the holding groove 18. Thus, more precise connection between the motor terminals 14 and the power supply terminals 26 can be achieved to stabilize the supply of electricity to the motor 3.

(5) Both the holding projection 10b and the holding groove 18 are made of resin. Thus, the resin-to-resin contact is achieved between the holding projection 10b and the holding groove 18. Therefore, vibration can be conducted from the holding projection 10b to the holding groove 18. However, the holding projection 10b is formed into the cylindrical shape, and each inner edge 18b, which contacts the holding projection 10b is formed into the arcuate shape. Thus, the holding projection 10d and the inner edge 18b form the point contact therebetween, thereby minimizing the contact surface area therebetween. As a result, the conduction of the vibration from the holding projection 10d to the casing 2 can be minimized.

(6) The holding projection 10b is formed integrally with the end frame 10. Thus, the manufacturing is eased.

(7) The motor 3 is supported by the motor holding portions 16, 17, 19, 20 through the rings 13a, 13b. Thus, the motor 3 (motor housing) does not directly contact the motor holding portions 16, 17, 19, 20, and the rings 13a, 13b absorb or damp the vibration. Therefore, the conduction of the vibration from the motor 3 to the casing 2 is minimized.

(8) Based on the torque generated upon rotation of the motor 3, the holding projection 10b is formed at the position, which is offset from the rotational axis A of the motor 3. Thus, the turning force, which causes the turning of the motor housing (i.e., the yoke housing 9 and the end frame 10) of the motor 3, can be more easily and effectively received by the holding projection 10b. As a result, the turning of the motor housing (i.e., the yoke housing 9 and the end frame 10) of the motor 3 can be more effectively limited.

The present embodiment can be modified as follows.

In the above embodiment, the holding projection 10b directly contacts the respective inner edges 18b. Alternatively, a rubber ring, which serves as a vibration absorbing member or elastic member, can be provided around the holding projection 10b. In this way, the resin holding projection 10b do not directly contact the resin inner edges 18b. Furthermore, the ring provided around the holding projection 10b absorbs or damps the vibration, so that the conduction of the vibration from the holding projection 10b to the casing 2 can be further reduced.

In the above embodiment, the holding groove 18 is formed in the motor holding portion 16 and extends along the imaginary line, which is perpendicular to the rotational axis A of the motor 3 and is parallel to the magnetic pole center line 15. However, the present invention is not limited to this. For example, the holding groove 18 does not need to be formed along the imaginary line, which is perpendicular to the rotational axis A of the motor 3 and is parallel to the magnetic pole center line 15. However, the holding groove 18 should be formed to allow movement of the motor 3 in a direction that is parallel to the magnetic pole center line 15.

In the above embodiment, the single holding projection 10*b* and the single holding groove 18 are provided. Alternatively, two or more holding projections and two or more holding grooves can be formed. In this way, the turning of the motor housing of the motor 3 can be more effectively limited at the time of actuating the motor 3 and at the time of the stopping the motor 3.

In the above embodiment, the holding projection 10*b* is formed in the end frame 10. Alternatively, the holding projection 10*b* can be formed in the base of the yoke housing 9, and the holding groove 18 can be formed in a corresponding position, which allows engagement of the holding projection 10*b* with the holding groove 18. In this case, the advantage similar to the one discussed in the above section (4) can be achieved.

In the above embodiment, the holding groove 18 is formed in the motor holding portion 16. Alternatively, the holding groove 18 can be formed in any one of the motor holding portions 17, 19, 20 other than the motor holding portion 16, and the holding projection 10*b* can be changed to engage with this holding groove 18.

In the above embodiment, each inner edge 18*b* is formed into the arcuate shape. Alternately, each inner edge 18*b* can be formed into, for example, a triangular shape or a planar shape. In the case where each inner edge 18*b* is formed into the triangular shape, the advantage similar to the one discussed above with respect to the arcuate inner edge 18*b* can be achieved. In the case where each inner edge 18*b* is formed into the planar shape, the cylindrical holding projection 10*b* makes line contact with the planar inner edge 18*b*. Thus, the advantage similar to the one discussed above with respect to the arcuate inner edge 18*b* can be achieved.

Figure 5:
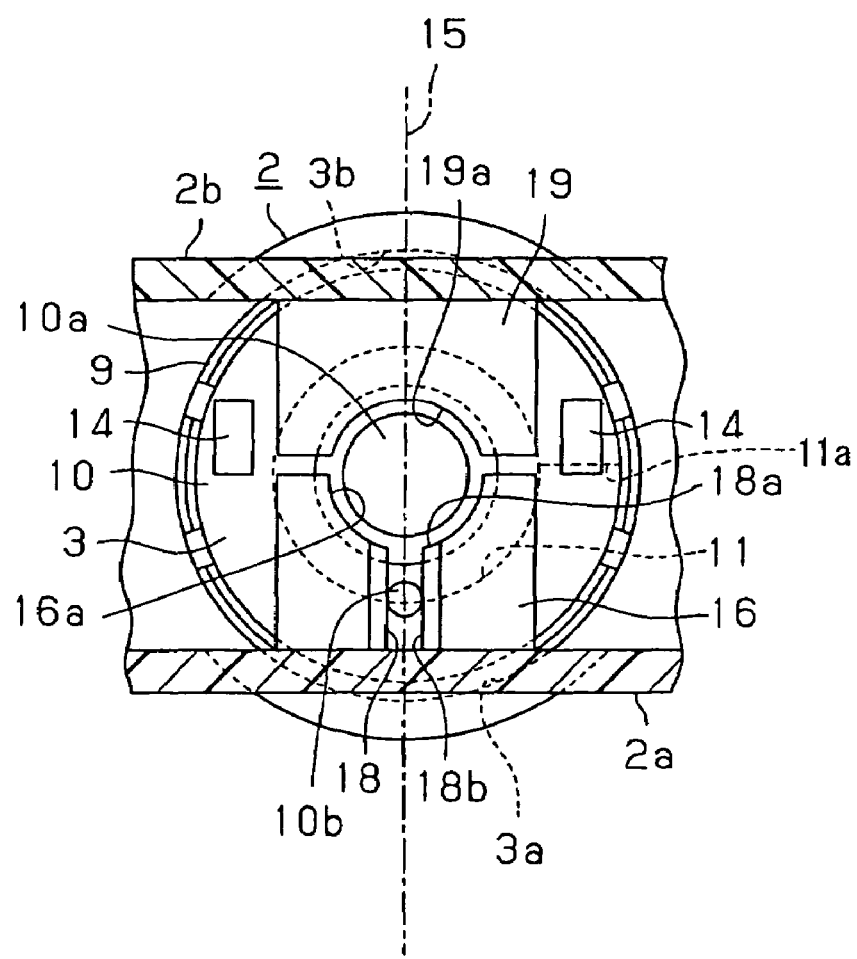
FIG. 5 is a view similar to FIG. 3B, showing a modification.

In the above embodiment, the arcuate permanent magnets 11 are used. Alternatively, a cylindrical permanent magnet 11, which has the two magnetic poles, can be used. Furthermore, each permanent magnet 11 is made of a ferrite magnet or a rubber magnet. When the rubber magnet is used to form the permanent magnet 11, the two magnetic poles can be provided in a single body, as shown in FIG. 5. In FIG. 5, the rubber magnet 11, which includes the two magnetic poles, is formed into a single plate. The rubber magnet 11 are then forcefully bent along the inner peripheral surface of the yoke housing 9, and ends of the rubber magnet 11 are opposed to one another at a dotted line 11*a* in FIG. 5. Since the rubber magnet 11 has elasticity, the permanent magnet 11 can be secured to the inner peripheral surface of the yoke housing 9 through the elastic deformation of the permanent magnet 11 without using adhesive or the like. Thus, the manufacturing costs of the motor 3 can be reduced in comparison to the case where the ferrite magnet is used to form the permanent magnet 11. Furthermore, due to the elasticity of the rubber magnet, the vibration of the motor 3 can be limited during the rotation of the motor 3.

In the above embodiment, the holding projection 10*b* is formed as the first engaging portion in the end frame 10, and the holding groove 18 is formed as the second engaging portion in the motor holding portion 16. Alternatively, a holding groove can be formed as the first engaging portion that extends in the radial direction of the motor 3 in the end frame 10, and a projection can be formed as the second engaging portion in the motor holding portion 16.

In the above embodiment, the holding projection 10*b* engages the holding groove 18 to limit the turning of the motor housing (i.e., the yoke housing 9 and the end frame 10) of the motor 3, and the movement of the motor 3 in the predetermined direction, which is perpendicular to the rotational axis A of the motor 3, is allowed. However, the present invention is not limited to this. For example, the bearing part of the end frame 10, which is formed into a cylindrical shape, can be supported by the motor holding portion, which has a recess that is shaped to correspond with the shape of the bearing part of the end frame 10. In this case, the motor 3 is allowed to move relative to the motor holding portion in the predetermined direction, which is perpendicular to the rotational axis A of the motor 3. With this structure, when the bearing part engages the recess of the motor holding portion, the turning of the motor housing (i.e., the yoke housing 9 and the end frame 10) of the motor 3 around the rotational axis A can be limited. Thus, the turning of the motor housing of the motor 3, which is caused by the reaction force generated at the time of actuating the motor 3 or at the time of stopping the motor 3, can be effectively limited.

Additional advantages and modifications will readily occur to those skilled in the art. The invention in its broader terms is therefore not limited to the specific details, representative apparatus, and illustrative examples shown and described.

What is claimed is:

1. A motor actuator comprising:
    a motor that includes:
        a motor housing; and
        a rotor that is rotatably received in the motor housing; and
    a casing that receives the motor and has at least one holding portion, wherein the at least one holding portion holds the motor in a manner that limits turning of the motor housing around a rotational axis of the motor while permitting movement of the motor housing in a predetermined direction, which is perpendicular to the rotational axis of the motor, wherein
    the casing includes a first casing part and a second casing part, which are connected to one another;
    an outer end surface of the motor housing has a first engaging portion;
    the at least one holding portion has a second engaging portion, which is engaged with the first engaging portion in a manner that limits the turning of the motor housing around the rotational axis of the motor while permitting the movement of the motor housing in the predetermined direction, which is perpendicular to the rotational axis of the motor; and
    the second engaging portion extends in the predetermined direction, which is generally parallel to an installation direction of the second casing part relative to the first casing part, to guide the first engaging portion in the predetermined direction at a time of installing the motor housing to the casing.

2. The motor actuator according to claim 1, further comprising a speed reducing mechanism that reduces a rotational speed of the motor.

3. The motor actuator according to claim 1, wherein:
    the motor housing holds at least one permanent magnet, which provides two diametrically opposed magnetic poles along en inner peripheral surface of the motor housing; and the at least one holding portion permits the movement of the motor housing in the predetermined direction, which is parallel to a magnetic pole center line that extends through a center of each of the two magnetic poles.

4. The motor actuator according to claim 3, wherein the at least one permanent magnet includes at least one rubber magnet.

5. The motor actuator according to claim 4, wherein the at least one rubber magnet includes a single rubber magnet, which has the two magnetic poles.

6. The motor actuator according to claim 1, wherein the at least one holding portion permits the movement of the motor housing in the predetermined direction that is parallel to the installation direction, in which the second casing part is installed to the first casing part.

7. The motor actuator according to claim 1, further comprising at least one elastic member, each of which is held between the motor housing and at least one of the at least one holding portion.

8. The motor actuator according to claim 1, wherein: the first engaging portion is a projection; and the second engaging portion is a groove tat is recessed in the one of the at least one holding portion in the predetermined direction, which is perpendicular to the rotational axis of the motor.

9. The motor actuator according to claim 1, wherein: the motor housing holds at least one permanent magnet, which provides two diametrically opposed magnetic poles along an inner peripheral surface of the motor housing; and the first engaging portion is positioned on an imaginary line, which is perpendicular to the rotational axis of the motor and is parallel to a magnetic pole center line that extends through a center of each of the two magnetic poles.

10. The motor actuator according to claim 1, wherein: the motor housing holds at least one permanent magnet, which provides two diametrically opposed magnetic poles along an inner peripheral surface of tire motor housing; and the second engaging portion permits the movement of the motor housing in the predetermined direction, which is parallel to a magnetic pole center line that extends through a center of each of the two magnetic poles.

11. The motor actuator according to claim 1, wherein the outer end surface of the motor housing has a plurality of motor terminals, which are engaged with a plurality of power supply terminals that supply electricity to the motor.

12. The motor actuator according to claim 1, wherein the first engaging portion is positioned away from the rotational axis of the motor in a radial direction of the motor.

13. The motor actuator according to claim 1, wherein a connection between the first engaging portion and the second engaging portion forms one of point contact and line contact.

14. The motor actuator according to claim 1, wherein the at least one holding portion protrudes in an interior of the casing.

* * * * *